US009210408B2

(12) United States Patent
Ooshima

(10) Patent No.: US 9,210,408 B2
(45) Date of Patent: Dec. 8, 2015

(54) STEREOSCOPIC PANORAMIC IMAGE SYNTHESIS DEVICE, IMAGE CAPTURING DEVICE, STEREOSCOPIC PANORAMIC IMAGE SYNTHESIS METHOD, RECORDING MEDIUM, AND COMPUTER PROGRAM

(71) Applicant: FUJIFILM Corporation, Tokyo (JP)

(72) Inventor: Hiroyuki Ooshima, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 443 days.

(21) Appl. No.: 13/689,642

(22) Filed: Nov. 29, 2012

(65) Prior Publication Data

US 2013/0083159 A1 Apr. 4, 2013

Related U.S. Application Data

(63) Continuation of application No. PCT/JP2011/064103, filed on Jun. 21, 2011.

(30) Foreign Application Priority Data

Jun. 24, 2010 (JP) ................................. 2010-143740

(51) Int. Cl.
*H04N 13/02* (2006.01)
*G03B 35/02* (2006.01)
(Continued)

(52) U.S. Cl.
CPC ............ *H04N 13/0282* (2013.01); *G03B 35/02* (2013.01); *G03B 37/02* (2013.01); *G06T 3/4038* (2013.01); *H04N 13/021* (2013.01); *H04N 13/0221* (2013.01)

(58) Field of Classification Search
CPC ...... G03B 35/02; G03B 37/02; G06T 3/4038; H04N 13/021; H04N 13/0221; H04N 13/0282
USPC .......................................................... 348/36
See application file for complete search history.

(56) References Cited

U.S. PATENT DOCUMENTS 4,943,852 A * 7/1990 Femano et al. ................. 348/49
5,745,126 A * 4/1998 Jain et al. ...................... 382/154
(Continued)

FOREIGN PATENT DOCUMENTS

EP  1048167 A1  11/2000
JP  11-164325 A  6/1999
(Continued)

OTHER PUBLICATIONS

International Search Report in PCT/JP2011/064103 dated Jul. 26, 2011(English Translation Thereof).
(Continued)

*Primary Examiner* — Shan Elahi
(74) *Attorney, Agent, or Firm* — McGinn IP Law Group PLLC

(57) ABSTRACT

Multiple images are acquired by continuously capturing images at high speed while panning an image capturing device (10). An optical flow between a reference image (previously captured image) and a currently captured image in a time sequence of imaging is calculated, and, based on this calculated optical flow, an image of an overlap area (i.e. area with disparity) between the images is cut out. Subsequently, the pair of cut images is stored in a memory (48) as a left image and a right image. After that, a left panoramic image is synthesized from multiple left images stored in the memory (48) and, similarly, a right panoramic image is synthesized from multiple right images.

15 Claims, 6 Drawing Sheets

(51) Int. Cl.
*G03B 37/02* (2006.01)
*G06T 3/40* (2006.01)

(56) References Cited

U.S. PATENT DOCUMENTS

| | | | | |
|---|---|---|---|---|
| 5,850,352 | A * | 12/1998 | Moezzi et al. | 345/419 |
| 6,094,215 | A | 7/2000 | Sundahl et al. | |
| 6,108,005 | A * | 8/2000 | Starks et al. | 345/419 |
| 6,549,650 | B1 * | 4/2003 | Ishikawa et al. | 382/154 |
| 7,899,321 | B2 * | 3/2011 | Cameron et al. | 396/325 |
| 8,456,518 | B2 * | 6/2013 | Pace et al. | 348/47 |
| 8,553,037 | B2 * | 10/2013 | Smith et al. | 345/473 |
| 8,665,321 | B2 * | 3/2014 | Choi et al. | 348/54 |
| 8,922,628 | B2 * | 12/2014 | Bond | 348/51 |
| 8,964,298 | B2 * | 2/2015 | Haddick et al. | 359/630 |
| 2001/0020976 | A1 | 9/2001 | Peleg et al. | |
| 2002/0081019 | A1 * | 6/2002 | Katayama et al. | 382/154 |
| 2002/0154812 | A1 | 10/2002 | Chen et al. | |
| 2003/0214712 | A1 * | 11/2003 | Yano et al. | 359/466 |
| 2005/0180623 | A1 * | 8/2005 | Mueller et al. | 382/154 |
| 2007/0285509 | A1 * | 12/2007 | Lee | 348/43 |
| 2007/0285554 | A1 * | 12/2007 | Givon | 348/340 |
| 2009/0237491 | A1 * | 9/2009 | Saito | 348/47 |
| 2010/0194972 | A1 * | 8/2010 | Matsuzawa et al. | 348/349 |
| 2011/0058021 | A1 * | 3/2011 | Chen et al. | 348/46 |

FOREIGN PATENT DOCUMENTS

| | | |
|---|---|---|
| JP | 11-164326 A | 6/1999 |
| JP | 2002-501349 A1 | 1/2002 |
| JP | 2002-366948 A | 12/2002 |
| JP | 2003-524927 A | 8/2003 |
| JP | 2009-103980 A | 5/2009 |
| WO | WO99/35855 A1 | 7/1999 |

OTHER PUBLICATIONS

PCT/ISA/237 (written opinion of the international searching authority with English translation, dated Aug. 2, 2011).
PCT/IB/326.
PCT/IB/338.
PCT/IB/373.

* cited by examiner

1ST shot    (n-x)th shot    n-th shot

STEREOSCOPIC PANORAMIC IMAGE SYNTHESIS DEVICE, IMAGE CAPTURING DEVICE, STEREOSCOPIC PANORAMIC IMAGE SYNTHESIS METHOD, RECORDING MEDIUM, AND COMPUTER PROGRAM

CROSS-REFERENCE TO RELATED APPLICATIONS

This application is a PCT Bypass continuation application and claims the priority benefit under 35 U.S.C. §120 of PCT Application No. PCT/JP2011/064103 filed on Jun. 21, 2011 which application designates the U.S., and also claims the priority benefit under 35 U.S.C. §119 of Japanese Patent Application No. 2010-143740 filed on Jun. 24, 2010, which applications are all hereby incorporated in their entireties by reference.

BACKGROUND OF THE INVENTION

1. Field of the Invention

The presently disclosed subject matter relates to a stereoscopic panoramic image synthesis device, an image capturing device and a stereoscopic panoramic image synthesis method, and particularly, the presently disclosed subject matter relates to a technique of synthesizing a stereoscopic panoramic image based on an image captured by a monocular camera.

2. Description of the Related Art

In the related art, there is known a panoramic image synthesis method of capturing a sequence of images using a video camera which is fixed to a tripod or the like and rotated, combining slit images cut in a slit shape from these captured sequence of images and synthesizing a panoramic image (Japanese Patent Application Laid-Open No. 11-164325).

According to the panoramic image synthesis method described in this Japanese Patent Application Laid-Open No. 11-164325, by determining a slit image width based on the optical flow size between two consecutive images, cutting slit images and synthesizing them, it is possible to reliably reproduce a panoramic image even in a case where angular velocity of the video camera is not constant.

Also, Japanese Patent Application Laid-Open No. 2002-366948 discloses a range imaging system that can synthesize a three-dimensional space panorama.

SUMMARY OF THE INVENTION

The abstract of Japanese Patent Application Laid-Open No. 11-164325 discloses combining slit images cut in a slit shape from captured consecutive images and generating panoramic images for right and left eyes, the specification of Japanese Patent Application Laid-Open No. 11-164325 contains no description related to generation of panoramic images for the right and left eyes.

In the range imaging system disclosed in Japanese Patent Application Laid-Open No. 2002-366948, a modulated electromagnetic radiation beam is irradiated to a scene and its reflection beam (i.e. image bundle formed with at least three images) is captured by a camera as a laser radar. This range imaging system differs from a normal camera in irradiating a modulated electromagnetic radiation beam.

It is an object of the presently disclosed subject matter to provide a new stereoscopic panoramic image synthesis device, an image capturing device and a stereoscopic panoramic image synthesis method that can synthesize a stereoscopic panoramic image from multiple images captured by panning a monocular image capturing device.

To achieve the above object, a stereoscopic panoramic image synthesis device according to a first aspect includes: an image acquisition unit that acquires multiple images continuously captured at a predetermined frame rate while panning an image capturing device having a single imaging optical system and an imaging element; an image selection unit that selects images for panoramic image synthesis from the acquired multiple images and selects images in which a horizontal component of a translation vector of an optical flow between the images is within a predetermined range set in advance; an overlap area detection unit that detects an overlap area between temporally adjacent images in the selected images; a trimming unit that cuts out images of the detected overlap area; a storage unit that stores the cut images of the overlap area as a left image and a right image; and a panoramic image synthesis unit that synthesizes a left panoramic image and a right panoramic image based on an image group of the stored left image and an image group of the stored right image.

Among the multiple images captured by panning the image capturing device (monocular image capturing device) having the single imaging optical system and the imaging element, the images of the overlap area between the temporally adjacent images correspond to the left viewpoint image and the right viewpoint image. Therefore, in the stereoscopic panoramic image synthesis device according to the first aspect, it is possible to cut out the images of the overlap area, use these as an image group of left images and an image group of right images, synthesize a panoramic image of the left image from the image group of left images and synthesize a panoramic image of the right image from the image group of right images.

Also, in the synthesized stereoscopic panoramic image, it is preferable that the stereoscopic effect of a certain subject in the same distance does not change by the imaging direction. Therefore, in the stereoscopic panoramic image synthesis device according to the first aspect, an image is selected in which the horizontal component of a translation vector of an optical flow between temporally adjacent images is within a predetermined range set in advance.

According to a second aspect, the stereoscopic panoramic image synthesis device according to the first aspect further includes: a correspondence point detection unit that sets a predetermined image among the acquired multiple images as a reference image, and detects correspondence points having a same feature between the reference image and one or multiple different images captured at different time from that of the reference image; and an optical flow calculation unit that calculates the optical flow based on the correspondence points detected by the correspondence point detection unit, where the image selection unit selects an image in which a horizontal component of a translation vector of the calculated optical flow is within a predetermined range set in advance, and sets the different selected image as a next reference image.

According to a third aspect, in the stereoscopic panoramic image synthesis device according to the first or second aspect, the panoramic image synthesis unit trims each image of the image group of the stored left image in a slit shape according to a horizontal component of a translation vector of an optical flow between the images and synthesizes the trimmed slit-shaped images based on the translation vectors of the optical flows to generate a left panoramic image, and trims each image of the image group of the stored right image in a slit shape according to a horizontal component of a translation vector of an optical flow between the images and synthesizes the trimmed slit-shaped images based on the translation vectors of the optical flows to generate a right panoramic image.

According to a fourth aspect, in the stereoscopic panoramic image synthesis device according to the first or second aspect, the panoramic image synthesis unit synthesizes the left panoramic image by relatively shifting the image group of the left image in a time sequential manner based on the translation vectors of the optical flows between the images of the image group of the stored left image and mapping the image group over a memory, and synthesizes the right panoramic image by relatively shifting the image group of the right image in a time sequential manner based on the translation vectors of the optical flows between the images of the image group of the stored right image and mapping the image group over a memory.

The stereoscopic panoramic image synthesis device according to the third aspect is configured to trim non-overlapped slit-shaped image of each image group and synthesize a panoramic image by synthesizing the trimmed slit-shaped images. The stereoscopic panoramic image synthesis device according to the fourth aspect is configured to synthesize a panoramic image by relatively shifting each image group in a time sequential manner based on the translation vectors of the optical flows between the images of the image group and mapping the image groups over a memory.

According to a fifth aspect, in the stereoscopic panoramic image synthesis device according to the third or fourth aspect, the panoramic image synthesis unit includes a trimming unit that trims images of an area having an overlapping pixel between the left panoramic image and the right panoramic image synthesized by the image synthesis unit. By this means, even in a case where a panning operation of the image capturing device is not performed accurately and horizontally, it is possible to acquire a good stereoscopic panoramic image.

According to a sixth aspect, the stereoscopic panoramic image synthesis device according to one of the first to fifth aspects further includes a recording unit that records the left panoramic image and the right panoramic image generated by the panoramic image synthesis unit in association with each other.

An image capturing device according to a seventh aspect includes the stereoscopic panoramic image synthesis device according to one of the first to sixth aspects.

According to an eighth aspect, the image capturing device according to the seventh aspect further includes: a mode setting unit that sets a stereoscopic panoramic imaging mode; and a control unit that fixes a focus position, an exposure condition and a white balance gain and continuously captures images at the predetermined frame rate when the stereoscopic panoramic imaging mode is selected and an imaging start instruction is input.

By this means, it is possible to fix the focus position, exposure condition and white balance gain of each slit-shaped image for panoramic image synthesis.

According to a ninth aspect, the image capturing device according to the seventh or eighth aspect further includes: a mode setting unit that sets a stereoscopic panoramic imaging mode; a translation vector calculation unit that calculates a horizontal component of a translation vector of an optical flow between images captured at a time of imaging in the stereoscopic panoramic imaging mode; and an alert unit that issues an alert when an absolute value of the horizontal component of the translation vector calculated by the translation vector calculation unit is larger than a threshold set in advance.

According to a tenth aspect, the image capturing device according to the seventh or eighth aspect further includes: a mode setting unit that sets a stereoscopic panoramic imaging mode; an angular velocity detection unit that detects an angular velocity of the image capturing device at a time of imaging in the stereoscopic panoramic imaging mode; and an alert unit that issues an alert when the angular velocity detected by the angular velocity detection unit is larger than a maximum angular velocity set based on the predetermined frame rate.

If the panning velocity (i.e. swing velocity or angular velocity) of the image capturing device is too large, the overlap area becomes small, and, when there is no common area for synthesis between images of image groups, panoramic image synthesis becomes impossible. Therefore, the image capturing device according to the ninth aspect is configured to issue an alert in a case where the horizontal component of the translation vector calculated by the translation vector calculation unit is over a threshold set in advance. Meanwhile, the image capturing device according to the tenth aspect is configured to issue an alert in a case where the angular velocity of the image capturing device is over a maximum angular velocity set based on the predetermined frame rate.

A stereoscopic panoramic image synthesis method according to an eleventh aspect includes: a step of acquiring multiple images continuously captured at a predetermined frame rate while panning an image capturing device having a single imaging optical system and an imaging element; a step of selecting images for panoramic image synthesis from the acquired multiple images and selecting images in which a horizontal component of a translation vector of an optical flow between the images is within a predetermined range set in advance; a step of detecting an overlap area between temporally adjacent images in the selected images; a trimming step of cutting out images of the detected overlap area; a step of storing the cut images of the overlap area as a left image and a right image; and a panoramic image synthesis step of synthesizing a left panoramic image and a right panoramic image based on an image group of the stored left image and an image group of the stored right image.

According to a twelfth aspect, the stereoscopic panoramic image synthesis method according to the eleventh aspect further includes a step of trimming images of an area having an overlapping pixel between the synthesized left panoramic image and right panoramic image, respectively. Also, regarding a computer program that includes a computer-executable command and can cause a computer to perform the stereoscopic panoramic image synthesis method according to the eleventh or twelfth aspect, by executing this computer program on the computer, it is possible to achieve the above object. Further, regarding the computer-readable recording medium recording the above computer program, by installing this computer program in the computer via this recording medium and executing it, it is possible to achieve the above object.

According to the presently disclosed subject matter, it is possible to synthesize a stereoscopic panoramic image from multiple images captured by panning a normal image capturing device (i.e. monocular image capturing device).

DETAILED DESCRIPTION OF THE EMBODIMENTS

In the following, with reference to the accompanying drawings, an explanation is given to embodiments of a stereoscopic panoramic image synthesis device, an image capturing device and a stereoscopic panoramic image synthesis method according to the presently disclosed subject matter.

[Overall Configuration of Image Capturing Device]

Figure 1:
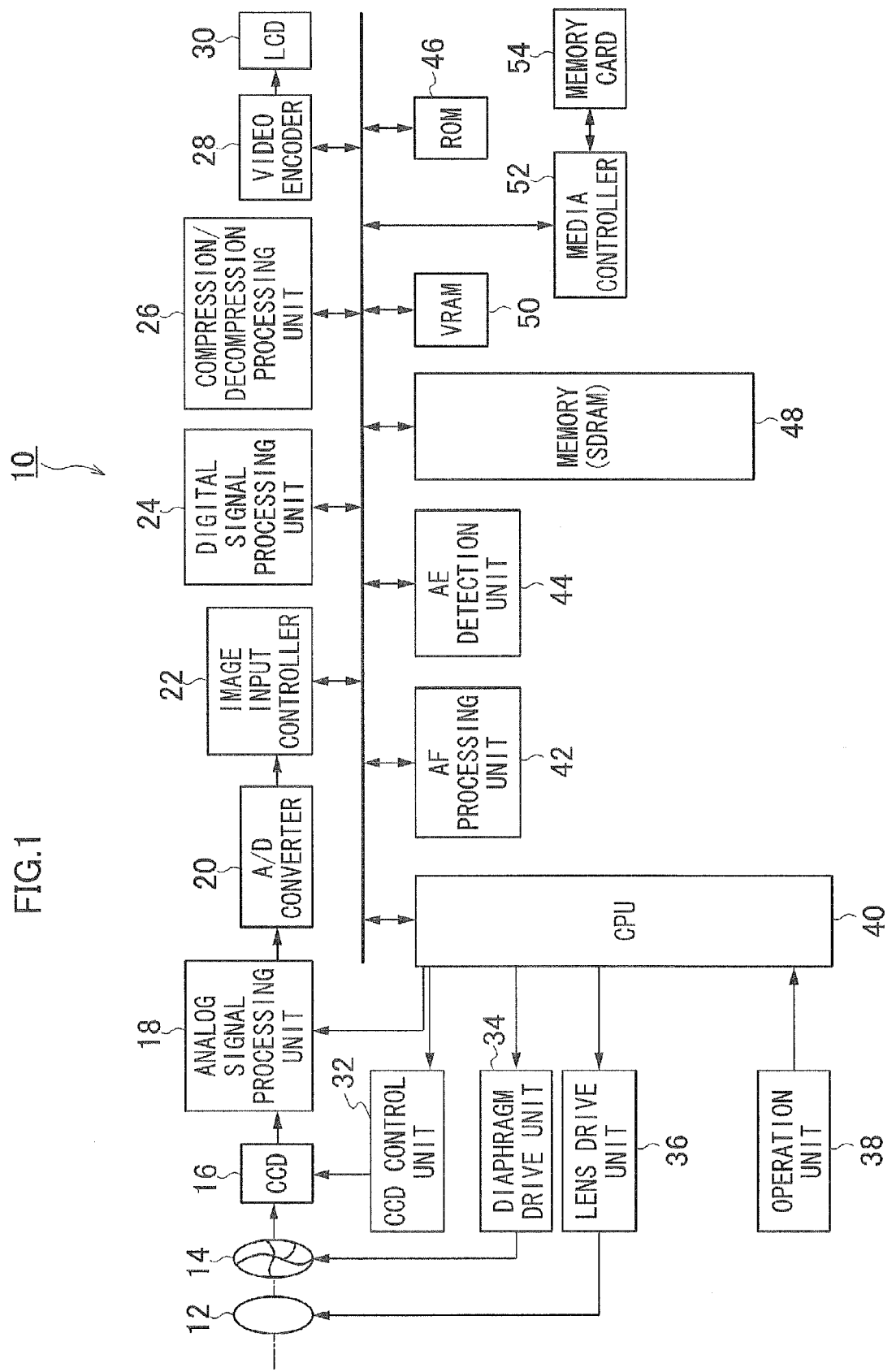
FIG. 1 is a block diagram illustrating an embodiment of an image capturing device according to the presently disclosed subject matter.

FIG. 1 is a block diagram illustrating an embodiment of an image capturing device 10 according to the presently disclosed subject matter.

This image capturing device 10 records a captured image such as a still picture and a motion picture in a recording medium 54 such as a memory card, and the overall device operation is integrally controlled by a Central Processing Unit (CPU) 40.

The image capturing device 10 includes an operation unit 38 such as a shutter button, a mode dial, a playback button, a MENU/OK key, an arrow key and a BACK key. A signal from this operation unit 38 is input in the CPU 40, and the CPU 40 controls each circuit of the image capturing device 10 based on the input signal to perform, for example, lens drive control, diaphragm drive control, imaging operation control, image processing control, image data record/playback control, display control of a 2D/3D-display liquid crystal monitor 30 or the like and perform stereoscopic (3D) panoramic image synthesis processing according to the presently disclosed subject matter described later.

The shutter button is an operation button to input an imaging start instruction and is formed with two-stage stroke type switches including an S1 switch turned on when the button is pressed halfway and an S2 switch turned on when the button is fully pressed. The mode dial is a selection unit to select an imaging mode. Examples of the imaging mode include an automatic imaging mode, a manual imaging mode, a scene position such as a person, landscape and night scene, a motion picture mode to capture a motion picture, and a stereoscopic panoramic imaging mode according to the presently disclosed subject matter.

The playback button is a button to switch a mode to a playback mode to display an imaged and recorded still picture or motion picture on a liquid crystal monitor 30. The MENU/OK key is an operation key having a function as a menu button to give an instruction to display a menu on a screen of the liquid crystal monitor 30 and a function as an OK button to give an instruction to determine and execute selection content. The arrow key is an operation unit to input an instruction of four directions of left, right, top and bottom, and functions as a button (i.e. cursor movement operation unit) to select an item from the menu button or instruct selection of various setting items from each menu. Also, the top and bottom keys of the arrow key function as a zoom switch at the time of imaging or a playback zoom switch at the time of playback, and the left and right keys function as a frame advance (forward direction/backward direction advance) button at the time of the playback mode. The BACK key is used to delete a desired target such as a selection item, cancel instruction content or return a state to the previous operation state.

At the time of the imaging mode, image light indicating a subject is formed on a light receiving surface of a solid-state imaging element 16 via a single imaging optical system (e.g. zoom lens) 12 and a diaphragm 14. In the following, although an explanation is given using a CCD (Charge Coupled Device) as an example of the solid-state imaging element, it does not intend to limit a type of the solid-state imaging element. The imaging optical system 12 is driven by a lens drive unit 36 controlled by the CPU 40 and subjected to focus control, zoom control and so on. The diaphragm 14 is formed with, for example, five diaphragm blades, driven by a diaphragm drive unit 34 controlled by the CPU 40 and subjected to, for example, five-stage diaphragm control from diaphragm value F2.8 to diaphragm value F11 at 1 AV intervals.

Also, the CPU 40 controls the diaphragm 14 via the diaphragm drive unit 34, controls a charge accumulation time (i.e. shutter speed) in the CCD 16 via a CCD control unit 32 and controls the reading of an image signal from the CCD 16.

The signal charge accumulated in the CCD 16 is read as a voltage signal corresponding to a signal charge based on a reading signal added by the CCD control unit 32. The voltage signal read from the CCD 16 is added to an analog signal processing unit 18. In the analog signal processing unit 18, the R, G and B signals of each pixel are subjected to sampling hold, amplified and subsequently added to an A/D converter 20. The A/D converter 20 converts the R, G and B signals, which are sequentially input, into digital R, G and B signals and outputs these to an image input controller 22.

A digital signal processing unit 24 performs predetermined signal processing such as offset processing, gain control processing including white balance correction and sensitivity correction, gamma correction processing, distortion correction processing, chromatic aberration correction processing, synchronization processing, YC processing and sharpness correction processing on the digital image signals input via the image input controller 22. Also, a ROM (or EEPROM (Electrically Erasable Programmable Read Only Memory)) 46 stores a camera control program, defect information of the CCD 16, various correction parameters and tables used for image processing, software for 3D panoramic image synthesis, and so on.

The image data processed in the digital signal processing unit 24 is output to a VRAM (Video Random Access Memory) 50. The VRAM 50 includes an A area and a B area to store image data indicating one frame image, and, in the VRAM 50, the image data indicating one frame image is alternately overwritten in the A area and the B area. Out of the A area and the B area of the VRAM 50, written image data is read from an area different from an area in which the image data is overwritten. The image data read from the VRAM 50 is encoded in a video encoder 28 and output to a liquid crystal monitor 30 set in the back of the camera, such that a captured image is displayed on a display screen of the liquid crystal monitor 30.

This liquid crystal monitor 30 can display a 2D image (i.e. plain image) as well as a 3D image (i.e. stereoscopic image formed with the left viewpoint image and right viewpoint image). For example, the liquid crystal monitor 30 may be configured as a stereoscopic display device that can display a directivity image having a predetermined directivity by parallax barrier. A configuration of the liquid crystal monitor 30 is not limited to this, and it may adopt a configuration using a lenticular lens or may be configured such that it is possible to look the left viewpoint image and the right viewpoint image by wearing dedicated glasses such as polarized glasses and liquid crystal shutter glasses.

Also, when the shutter button of the operation unit 38 is pressed on the first stage (i.e. halfway), the CPU 40 starts an AF (Auto Focus) operation and AE (Auto Exposure) operation and performs control such that a focus lens in the imaging optical system 12 is arranged in a focusing position via the lens drive unit 36. Also, image data output from the A/D converter 20 at the time the shutter button is pressed halfway, is imported in an AE detection unit 44.

The AE detection unit 44 integrates G signals of the entire screen or integrates G signals subjected to different weightings in the screen central part and the peripheral part, and outputs the integration value to the CPU 40. The CPU 40 calculates the subject brightness (i.e. imaging Ev value) from the integration value input from the AE detection unit 44, based on this imaging Ev value, determines a diaphragm vale of the diaphragm 14 and the electronic shutter (i.e. shutter speed) of the CCD 16 according to a predetermined program diagram and controls the diaphragm 14 via the diaphragm drive unit 34 based on the determined diaphragm value. Further, the CPU 40 controls a charge accumulation time in the CCD 16 via the CCD control unit 32 based on the determined shutter speed.

The AF processing unit 42 is a part to perform contrast AF processing, and calculates an AF evaluation value indicating a focusing state by extracting the higher frequency components of image data in a predetermined focus area in image data and integrating these higher frequency components. The AF control is performed by controlling the focus lens in the imaging optical system 12 such that this AF evaluation value is maximal.

When the AE operation and the AF operation are finished and the shutter button is pressed on the second stage (i.e. fully), image data output from the A/D converter 20 in response to this press is output from the image input controller 22 to a memory (e.g. SDRAM (Synchronous Dynamic RAM)) 48 and temporarily stored.

The image data temporarily stored in the memory 48 is adequately read by the digital signal processing unit 24. The digital signal processing unit 24 performs predetermined signal processing including generation processing (i.e. YC processing) of brightness data and color difference data of the image data. The image data (i.e. YC data) subjected to YC processing is stored in the memory 48 again. Subsequently, the YC data is output to a compression/decompression processing unit 26, subjected to predetermined compression processing such as JPEG (Joint Photographic Experts Group) and stored in the memory 48 again.

An image file is generated from the YC data (i.e. compression data) stored in the memory 48, read by a media controller 52 and stored in a memory card 54.

<Principle of the Presently Disclosed Subject Matter>

Next, the principle of 3D panoramic image synthesis processing by the monocular image capturing device 10 is explained.

Figure 2:
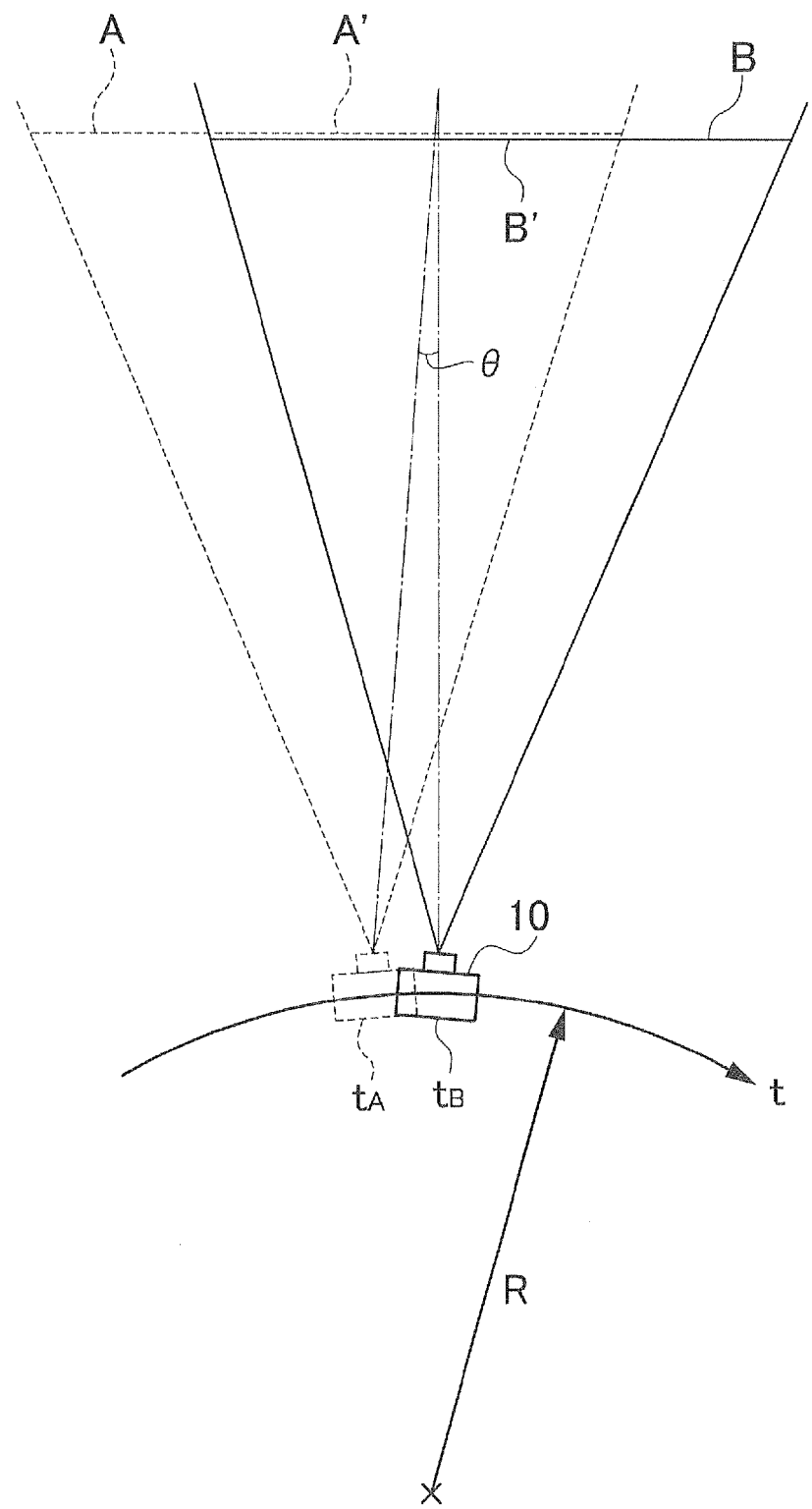
FIG. 2 is an explanation view for explaining a principle of a three-dimensional panoramic image synthesis processing by the image capturing device according to the presently disclosed subject matter.

As illustrated in FIG. 2, the image capturing device 10 is held by hands and subjected to panning at substantially constant rotation speed in the right direction to capture a sequence of images at predetermined frame rate (e.g. 60 frame/second).

By continuously capturing images at high speed as above, an image A captured at certain time $t_A$ and an image B captured at certain time $t_B$ slightly after the time $t_A$, partially overlap with each other.

When the mutually overlapping images from the images A and B are cut out and the cut images are assumed as images A' and B', these images A' and B' are viewpoint images (i.e. left image and right image) captured at different viewpoint positions. Also, in the example illustrated in FIG. 2, the convergence angle corresponding to the images A' and B' is θ.

That is, the images A' and B' form a 3D image that can be sterically displayed. By cutting out mutually overlapping images from temporally adjacent images captured during panning of the image capturing device 10, one is acquired as the left image and the other is acquired as the right image. By this means, it is possible to acquire multiple left images and right images for 3D panoramic image synthesis.

<Image Acquisition for 3D Panoramic Image Synthesis>

FIGS. 3A to 3D are views illustrating an acquisition flow of images for 3D panoramic image synthesis.

Figure 3A:
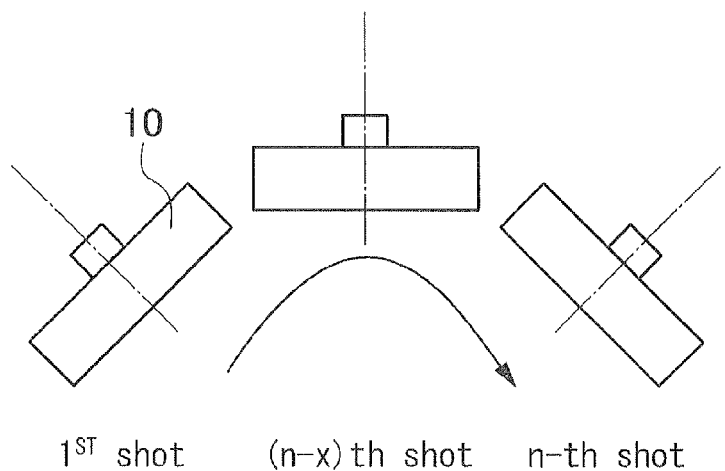
FIG. 3A is a view illustrating an acquisition flow of images used for three-dimensional panoramic image synthesis (version 1)

First, as illustrated in FIG. 3A, the image capturing device 10 is held by hands and subjected to panning to continuously capture images at high speed. In this case, the imaging is finished when n (n shots) images set in advance are captured or when it is decided that rotation is performed by a predetermined angle, and it shifts to panoramic image synthesis processing.

Figure 3B:
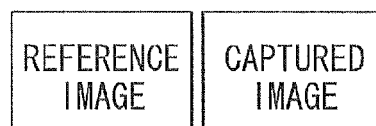
FIG. 3B is a view illustrating the acquisition flow of images used for three-dimensional panoramic image synthesis (version 2)

As illustrated in FIG. 3B, an optical flow of images between a reference image (i.e. captured image of the previous shot) and a captured image of the current shot is calculated based on correspondence point detection. That is, feature points on the reference image and feature points on the captured image corresponding to those feature points are detected as correspondence points, and the optical flow is calculated from the movement amount and movement direction (i.e. translation vector) between these correspondence points. Here, as a detection method of the correspondence points, there is a method of extracting feature points by, for example, a Harris method or the like and tracking the feature points using a KLT (Kanade Lucas Tomasi) method or the like.

Figure 3C:
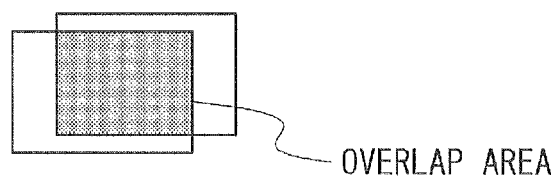
FIG. 3C is a view illustrating the acquisition flow of images used for three-dimensional panoramic image synthesis (version 3)

Next, as illustrated in FIG. 3C, based on the calculated optical flow, images in an overlap area (i.e. area with disparity) overlapping between the reference image and the captured image, are cut out from the reference image and the captured image.

Figure 3D:
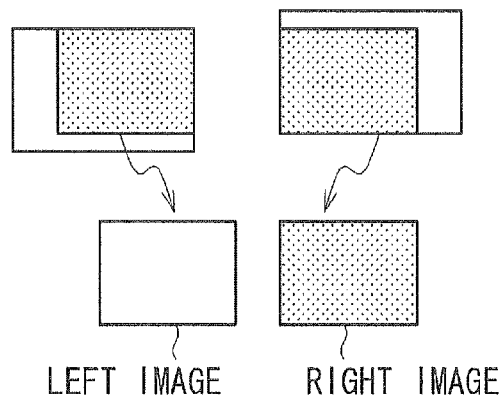
FIG. 3D is a view illustrating the acquisition flow of images used for three-dimensional panoramic image synthesis (version 4)

The pair of cut images are stored in the memory 48 (FIG. 3D). Here, in the case of images continuously captured during clockwise panning, the overlap area image cut out from the reference image is stored as the left image and the overlap area image cut out from the captured image is stored as the right image.

After the left image and right image of the overlap area are stored in the memory 48, the captured image is set as a reference image and the flow returns to the next imaging. That is, the processing illustrated in FIGS. 3B to 3D is repeated every one shot during continuous imaging. Subsequently, when it is decided that the image capturing device 10 is rotated by a predetermined angle from the start of imaging, the imaging is finished and the flow proceeds to processing of synthesizing a 3D panoramic image.

Also, when the processing illustrated in FIGS. 3B to 3D is not done in the imaging interval of each frame, multiple images continuously captured at high speed may be temporarily stored in the memory 48 and subsequently subjected to the processing illustrated in FIGS. 3B to 3D.

Figure 4A:
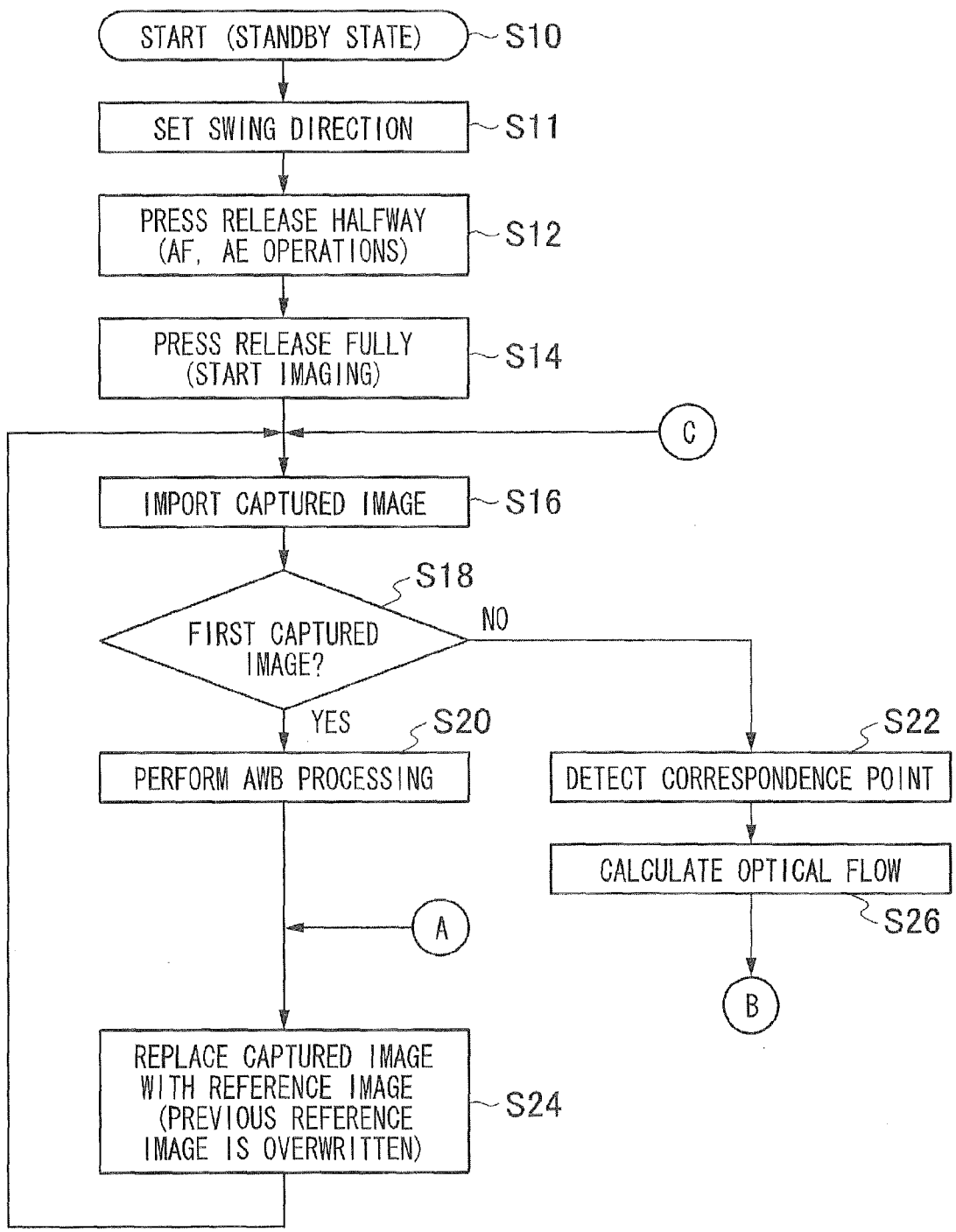
FIGS. 4A-4B are flowcharts illustrating an acquisition flow of images used for three-dimensional panoramic image synthesis.
Figure 4B:
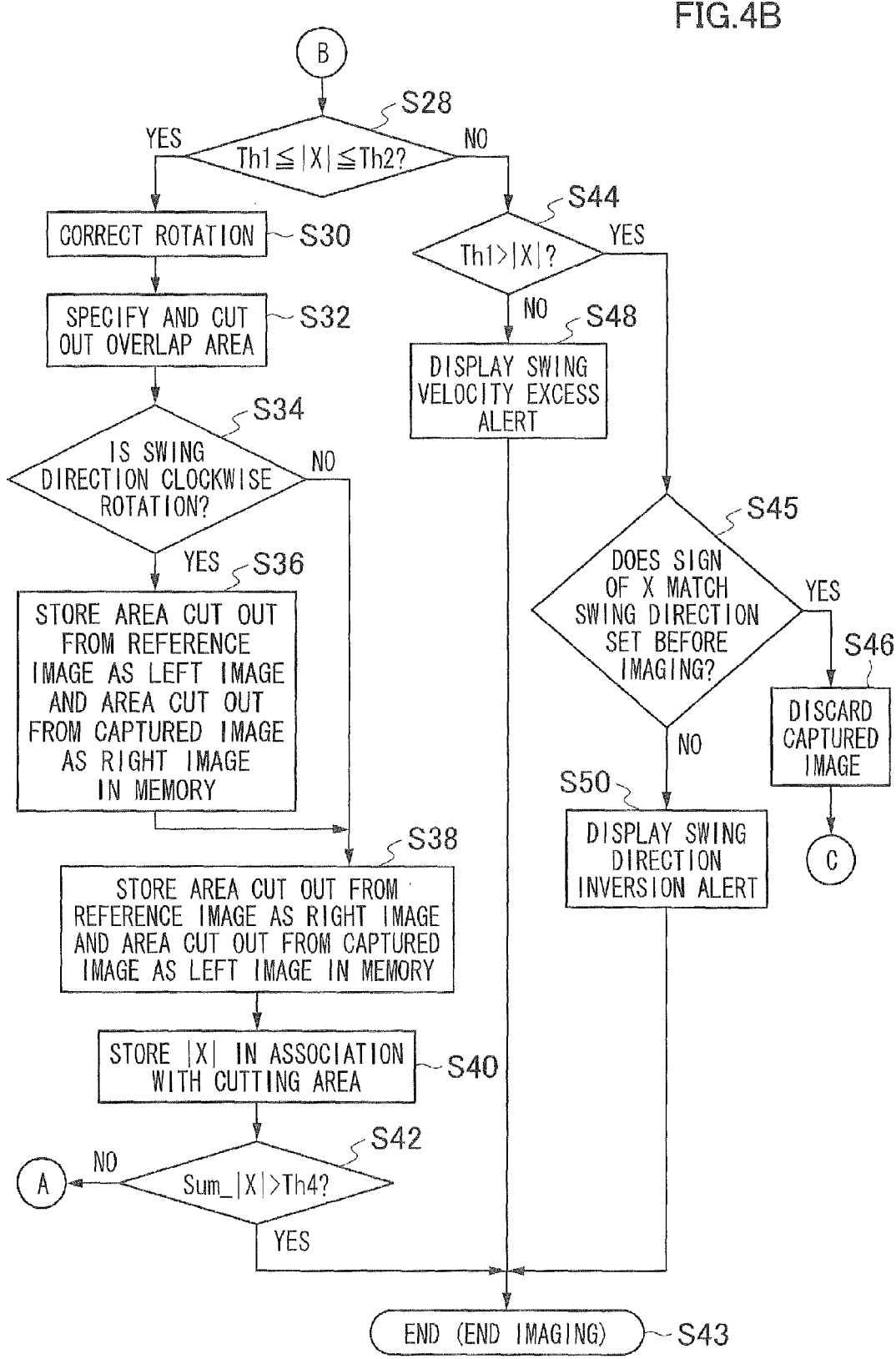

FIGS. 4A-4B are flowcharts illustrating the acquisition flow of images for 3D panoramic image synthesis in more detail.

In FIGS. 4A-4B, first, by the mode dial of the operation unit 38 illustrated in FIG. 1, a 3D panoramic imaging mode is selected to get in an imaging standby state (step S10).

Subsequently, the swing direction at the time of panning imaging is set (step S11), and, after the image capturing device 10 is moved to the panning start position to perform 3D panoramic imaging (i.e. after the construct is determined), the shutter button is pressed halfway (step S12). When receiving from the operation unit 38 an input of a signal indicating that the shutter button is pressed halfway, the CPU 40 starts the AF operation and the AE operation, performs control such that the focus lens in the imaging optical system 12 is arranged in the focusing position by the lens drive unit 36, and determines exposure conditions (e.g. the diaphragm value of the diaphragm 14 and the shutter speed of the CCD 16) based on a photometric value input from the AE detection unit 44 (step S12).

After that, when the shutter button is pressed fully, the CPU 40 starts continuous imaging according to the exposure conditions determined in step S12 (step S14). At this time, although a photographer causes the image capturing device 10 to perform panning clockwise, it is desirable to cause the image capturing device 10 to perform panning at predetermined swing velocity without being blurred in the vertical direction.

When the continuous imaging starts, an image captured by an image capturing unit including the CCD 16 is imported (step S16). The CPU 40 decides whether the imported captured image is the first captured image, and the flow proceeds to step S20 in the case of the first captured image (i.e. in the case of "Yes") and the flow proceeds to step S22 in the case of a second or subsequent captured images (i.e. in the case of "No") (step S18).

In step S20, based on the first captured image, the WB gain to correct the white balance (WB) of the captured image is calculated to perform white balance correction of the captured image (R, G and B signals) by this WB gain. Also, with respect to second or subsequent captured images, the WB gain calculated based on the first captured image is used to capture an image under the same focus position and exposure conditions as above. This is because the shade, focus position and brightness of each slit-shaped image used at the time of panoramic image synthesis are not changed, which is described later.

The first captured image subjected to image processing such as white balance correction in step S20 is temporarily stored in a working area of the memory 48 as a reference image (step S24).

Meanwhile, in step S22, when a second or subsequent captured image is acquired, correspondence point detection between the reference image (i.e. previously captured image) and the captured image is performed. Subsequently, an optical flow of the reference image and the captured image is calculated based on the calculated correspondence points (step S26).

Subsequently, it is decided whether the absolute value |x| of the horizontal component x of the translation vector of the calculated optical flow is within a predetermined range (i.e. threshold Th1≤|x|≤threshold Th2) (step S28). In a case where the absolute value |x| of the horizontal component x of the translation vector is within the predetermined range (i.e. in the case of "Yes"), rotation correction is performed so as to adjust the captured image to the reference image (step S30). After that, images in an overlap area between the reference image and the captured image subjected to rotation correction are specified and the overlap area images are cut out from the reference image and the captured image (step S32).

Next, it is decided whether the swing direction setting at the time of panning imaging is clockwise (step S34). The swing direction may be decided based on whether the direction, which is set by the user before the imaging, is clockwise or it is counterclockwise.

When it is decided that the swing direction is clockwise (i.e. in the case of "Yes"), the overlap area image cut out from the reference image is stored in the memory 48 as a left image and the overlap area image cut out from the captured image is stored in the memory 48 as a right image (step S36). Meanwhile, when it is decided that the swing direction is counterclockwise (i.e. in the case of "No"), the overlap area image cut out from the reference image is stored in the memory 48 as a right image and the overlap area image cut out from the captured image is stored in the memory 48 as a left image (step S38).

Next, the absolute value |x| of the horizontal component x of the translation vector of the optical flow is stored in the memory in association with the cut overlap area images (step S40). Further, a total sum Sum_|x| of the absolute value |x| of the horizontal component x from the imaging start is calculated and it is decided whether the total sum Sum_|x| is over a threshold Th4 (step S42). When it is over the threshold Th4 (i.e. in the case of "Yes"), it is regarded that images for 3D panoramic image synthesis in a predetermined angle range have been acquired, and the imaging is finished (step S43). At this time, on the liquid crystal monitor 30, it may report to the photographer that the imaging by the 3D panoramic imaging mode is finished.

Meanwhile, when it is not over the threshold Th4 (i.e. in the case of "No"), the captured image is replaced (i.e. overwritten) with a reference image (step S24) and the flow returns to step S16.

Also, in step S28, when it is decided that the absolute value |x| of the horizontal component x of the translation vector of the optical flow is not within the predetermined range (i.e. threshold Th1≤|x|≤threshold Th2) (in the case of "No"), it is decided whether the absolute value |x| of the horizontal component x of the translation vector is less than a lower-limit-side threshold Th1 (step S44). When it is less (i.e. in the case of "Yes"), the flow proceeds to step S45, and, based on the sign of the horizontal component x of the translation vector, it is decided whether the swing direction set in step S11 matches the swing direction at the time of panning imaging. For example, when the swing direction, which is set before the imaging in step S11, is clockwise and "x" is positive, it is decided that, similar to the setting, the swing direction at the time of actual panning imaging is clockwise. When the swing directions are matched (i.e. in the case of "Yes"), the current captured image is discarded (step S46) and the flow returns to step S16.

That is, when the absolute value |x| of the horizontal component x of the translation vector is less than the lower-limit-side threshold Th1 and the swing direction matches the set direction, the overlap area images between the reference image and the captured image are large and the disparity between the overlap area images is small. Therefore, in this case, the captured image is discarded so as to not adopt the captured image.

In step S45, when it is decided that the swing directions are not matched (i.e. in the case of "No"), the liquid crystal monitor 30 displays an alert that the swing directions are opposite (step S50), and the imaging by the 3D panoramic imaging mode is finished (step S43).

Meanwhile, in step S44, when it is decided that the absolute value |x| of the horizontal component x of the translation vector is greater than the lower-limit-side threshold Th1 (or when it is decided from the decision result in step S28 that it is greater than an upper-limit-side threshold Th2) (i.e. in the case of "No"), the liquid crystal monitor 30 displays an alert that the swing velocity at the time of panning imaging is too fast (step S48), and the imaging by the 3D panoramic imaging mode is finished (step S43). In this case, images for 3D panoramic image synthesis have not been acquired, and it is necessary to capture images again.

<3D Panoramic Image Synthesis Processing>

Next, an explanation is given to a synthesis processing sequence for synthesizing a 3D panoramic image using multiple left images and right images for 3D panoramic synthesis acquired as above.

FIGS. 5A to 5D are views illustrating a synthesis processing sequence of a 3D panoramic image.

Figure 5A:
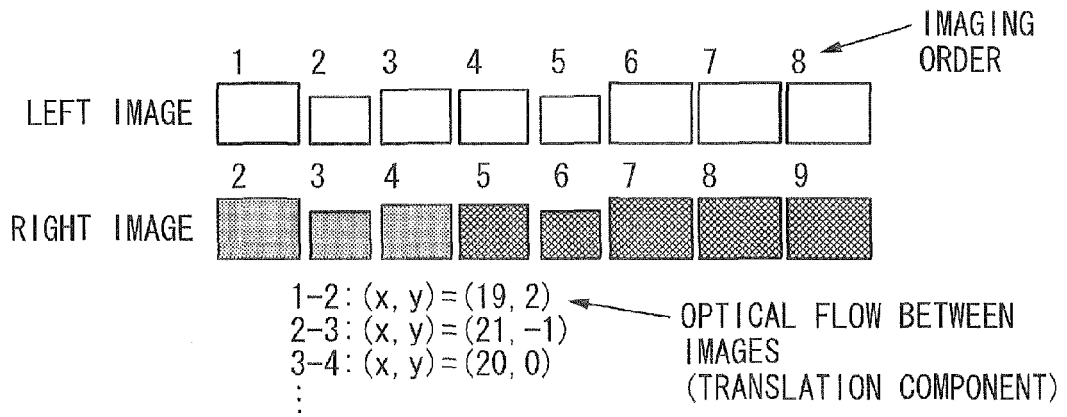
FIG. 5A is a view illustrating a synthesis processing sequence of three-dimensional panoramic images (version 1)

In FIG. 5A, reference numerals 1 to 9 designate time sequential images captured during the panning of the image capturing device 10, and the upper-stage images 1 to 8 and the lower-stage images 2 to 9 are left images and right images in overlap area images.

In processing of synthesizing these left images and right images, it is possible to use the optical flow calculated in step S26. In the example illustrated in FIG. 5A, as the optical flows (i.e. translation vector) between adjacent images 1 and 2, 2 and 3, 3 and 4, and so on, (x, y)=(19, 2), (21, −1), (20, 0), and so on, are calculated.

Figure 5B:
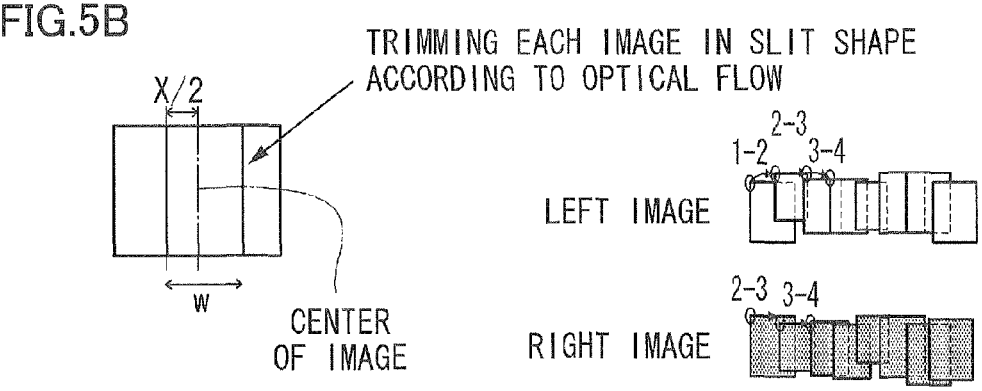
FIG. 5B is a view illustrating the synthesis processing sequence of three-dimensional panoramic images (version 2)
Figure 5C:
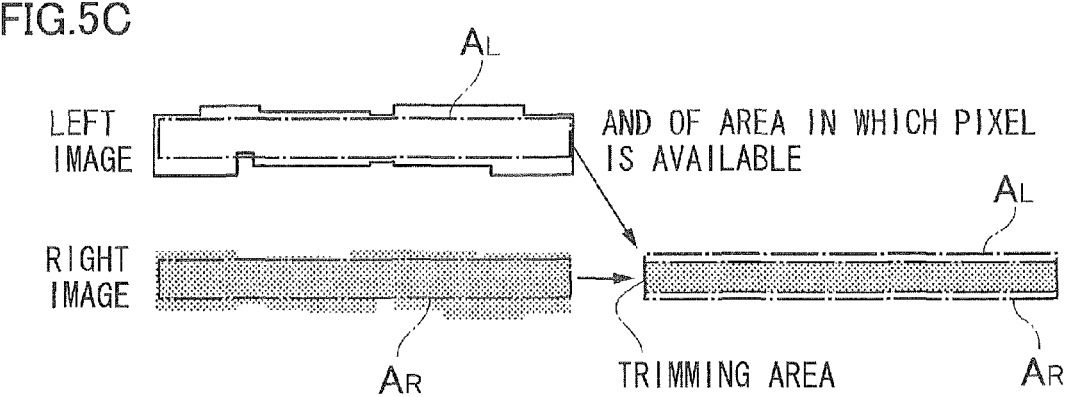
FIG. 5C is a view illustrating the synthesis processing sequence of three-dimensional panoramic images (version 3)

Subsequently, as illustrated in FIG. 5B, each image is trimmed in a slit shape based on the above calculated optical flows (i.e. translation vectors) (x, y)=(19, 2), (21, −1), (20, 0), and so on, and the trimmed slit-shaped images are synthesized in order. That is, a slit-shaped image of a fixed width w from a position shifted by ½ of the horizontal component x of the translation vector from the image center is cut out from the previously captured image and the subsequently captured image (i.e. two adjacent images in time sequential images), and these cut slit-shaped images are synthesized while being shifted in the vertical and horizontal directions by the translation vector. By this means, 3D panoramic image synthesis is completed.

Figure 5D:
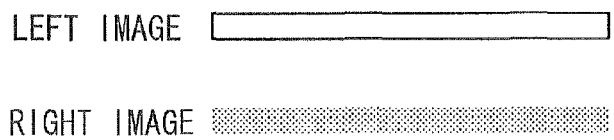
FIG. 5D is a view illustrating the synthesis processing sequence of three-dimensional panoramic images (version 4).

Next, in the left image and right image subjected to panoramic image synthesis, area images including mutually overlapping pixels are trimmed. In the example illustrated in FIG. 5C, images AL and AR of maximum rectangle areas are cut out from the left image and the right image, and an area image overlapping between these cut rectangle-area images AL and AR is determined as a trimming area. Further, as illustrated in FIG. 5D, a part corresponding to the determined trimming area is cut out from the left image and the right image.

These cut left image and right image are stored in the memory card 54 as a stereo image (i.e. 3D panoramic image). For example, a multipicture file (MP file: a file in a format in which multiple images are connected) is generated from two right and left panoramic images and this MP file is recorded in the memory card 54 via the media controller 52. Here, two right and left panoramic images are not limited to be stored in one MP file, and may be stored as respective image files as long as they are stored in association with each other.

[Others]

In the above embodiment, out of time-sequential captured images acquired during panning imaging, captured images are extracted in which the horizontal component x of a translation vector of the optical flow between the images is within a predetermined range, but a captured image extraction method is not limited to this. For example, an angular velocity sensor may be set in the image capturing device 10 to extract captured images in which the angle variation in the horizontal direction is within a predetermined range. Also, when the angle variation in the horizontal direction between adjacent images is over a predetermined upper limit value (i.e. maximum angular velocity set based on a frame rate), a swing velocity excess alert may be given.

Also, as illustrated in FIG. 2, when the swing radius R of the image capturing device 10 during panning imaging becomes small, the disparity between overlap area images becomes small. Therefore, a sensor or the like to detect the speed or acceleration in the horizontal direction may be set in the image capturing device 10 to measure the swing velocity V, calculate a swing radius R=V/Ω based on an output result Ω of the above angular velocity sensor and, when R is equal to or less than a predetermined threshold, alert that the swing radius is small.

Further, in the present embodiment, when synthesizing a 3D panoramic image using multiple left images and right images for 3D panoramic image synthesis, slit-shaped images are cut out based on optical flows between adjacent images and these cut slit-shaped images are connected. However, the left panoramic image may be synthesized by relatively shifting an image group of left images in a time sequential manner based on the translation vectors between images of the image group of left images and mapping the result over a memory, and, similarly, the right panoramic image may be synthesized by relatively shifting an image group of right images in a time sequential manner based on the translation vectors between images of the image group of right images and mapping the result over a memory. That is, the panoramic image synthesis method is not limited to the present embodiment and various methods are applicable.

Also, although the image capturing device according to the presently disclosed subject matter incorporates a 3D panoramic image synthesis function, the 3D panoramic image synthesis device may be configured by an external device such as a personal computer without an imaging function. In this case, images captured by panning a general digital camera or video camera having a continuous imaging function or a motion picture imaging function, are processed as input images. Further, a program that causes a computer to implement the 3D panoramic image synthesis processing according to the presently disclosed subject matter is prepared and installed in the computer. Subsequently, by executing this program in the computer, a 3D panoramic image is synthesized using the input images. Also, the program that causes a computer to implement the 3D panoramic image synthesis processing can be stored in a recording medium and installed in the computer via this recording medium. Examples of the recording medium include a magnetic optical disk, a flexible disk and a memory chip.

Further, the presently disclosed subject matter is not limited to the above embodiments and it is needless to say that various changes can be made without departing from the split of the presently disclosed subject matter.

What is claimed is:

1. A stereoscopic panoramic image synthesis device comprising:
an image acquisition device which acquires multiple images continuously captured at a predetermined frame rate while panning a single image capturing device including a single imaging optical system and an imaging element;
an image selection device which selects images for panoramic image synthesis from the multiple images acquired by the single image capturing device, the image selection device selects images in which a horizontal component of a translation vector of an optical flow between the images is within a predetermined range set in advance;
an overlap area detection device which detects an overlap area with disparity between temporally adjacent images in the selected images;
a trimming device which cuts out images of the detected overlap area;
a storage device which stores the cut images of the overlap area as a left image and a right image;
a panoramic image synthesis device which synthesizes a left panoramic image and a right panoramic image based on an image group of the stored left image and an image group of the stored right image;
a correspondence point detection device which sets a predetermined image among the acquired multiple images as a reference image, and which detects correspondence points having a same feature between the reference image and one or multiple different images captured at different time from that of the reference image; and
an optical flow calculation device which calculates the optical flow based on the correspondence points detected by the correspondence point detection device,
wherein the image selection device selects an image in which a horizontal component of a translation vector of the calculated optical flow is within a predetermined range set in advance, and sets the different selected image as a next reference image.

2. The stereoscopic panoramic image synthesis device according to claim 1,
wherein the panoramic image synthesis device trims each image of the image group of the stored left image in a rectangular shape according to a horizontal component of a translation vector of an optical flow between the images and synthesizes the trimmed rectangular-shaped images based on the translation vectors of the optical flows to generate a left panoramic image, and trims each image of the image group of the stored right image in a rectangular shape according to a horizontal component of a translation vector of an optical flow between the images and synthesizes the trimmed rectangular-shaped images based on the translation vectors of the optical flows to generate a right panoramic image.

3. The stereoscopic panoramic image synthesis device according to claim 2,
wherein the panoramic image synthesis device further comprises a trimming device which trims images of an area having an overlapping pixel between the left panoramic image and the right panoramic image synthesized by the image synthesis device.

4. The stereoscopic panoramic image synthesis device according to claim 1,
wherein the panoramic image synthesis device synthesizes the left panoramic image by relatively shifting the image group of the left image in a time sequential manner based on the translation vectors of the optical flows between the images of the image group of the stored left image and mapping the image group over a memory, and synthesizes the right panoramic image by relatively shifting the image group of the right image in a time sequential manner based on the translation vectors of the optical flows between the images of the image group of the stored right image and mapping the image group over a memory.

5. The stereoscopic panoramic image synthesis device according to claim 1, further comprising
a recording device which records the left panoramic image and the right panoramic image generated by the panoramic image synthesis device in association with each other.

6. An image capturing device comprising the stereoscopic panoramic image synthesis device according to claim 1.

7. The image capturing device according to claim 6, further comprising:
a mode setting device which sets a stereoscopic panoramic imaging mode; and
a control device which fixes a focus position, an exposure condition and a white balance gain and continuously capture images at the predetermined frame rate when the stereoscopic panoramic imaging mode is selected and an imaging start instruction is input.

8. The image capturing device according to claim 6, further comprising:
a mode setting device which sets a stereoscopic panoramic imaging mode;
a translation vector calculation device which calculates a horizontal component of a translation vector of an optical flow between images captured at a time of imaging in the stereoscopic panoramic imaging mode; and
an alert device which issues an alert when an absolute value of the horizontal component of the translation vector calculated by the translation vector calculation device is larger than a threshold set in advance.

9. The image capturing device according to claim 6, further comprising:
a mode setting device which sets a stereoscopic panoramic imaging mode;
an angular velocity detection device which detects an angular velocity of the image capturing device at a time of imaging in the stereoscopic panoramic imaging mode; and
an alert device which issues an alert when the angular velocity detected by the angular velocity detection device is larger than a maximum angular velocity set based on the predetermined frame rate.

10. The image capturing device according to claim 1, wherein the image acquisition device further includes an angular velocity device which sets the image acquisition device to acquire captured images in which an angle variation in a horizontal direction is within a predetermined range.

11. The image capturing device according to claim 1, wherein the image acquisition device further includes an acceleration detection device which detects a speed and/or an acceleration in a horizontal direction and measures a swing velocity and a swing radius of the image acquisition device, when R is equal to or less than a predetermined threshold, alert that the swing radius is small, and
an alert device which issues an alert when the swing velocity or swing radius detected by the acceleration detection device is less than a predetermined value.

12. The image capturing device according to claim 1, wherein, after the panoramic image synthesis device synthesizes the left panoramic image and the right panoramic image, the trimming device trims mutually overlapping pixels of the left panoramic image and the right panoramic image.

13. A stereoscopic panoramic image synthesis method comprising:
   acquiring multiple images continuously captured at a predetermined frame rate while panning a single image capturing device having a single imaging optical system and an imaging element;
   selecting images for panoramic image synthesis from the multiple images acquired by the single image capturing device, and selecting images in which a horizontal component of a translation vector of an optical flow between the images is within a predetermined range set in advance;
   detecting an overlap area with disparity between temporally adjacent images in the selected images;
   cutting out images of the detected overlap area;
   storing the cut images of the overlap area as a left image and a right image;
   synthesizing a left panoramic image and a right panoramic image based on an image group of the stored left image and an image group of the stored right image;
   setting a predetermined image among the acquired multiple images as a reference image;
   detecting correspondence points having a same feature between the reference image and one or multiple different images captured at different time from that of the reference image; and
   calculating the optical flow based on the correspondence points detected by the detecting correspondence points,
   wherein said selecting images selects an image in which a horizontal component of a translation vector of the calculated optical flow is within a predetermined range set in advance, and sets the different selected image as a next reference image.

14. The stereoscopic panoramic image synthesis method according to claim 13,
   wherein the synthesizing further comprises a step of trimming images of an area having an overlapping pixel between the left panoramic image synthesized by the synthesizing and the right panoramic image synthesized by the synthesizing, respectively.

15. A non-transitory computer-readable recording medium recording a computer program causing at least one computer to perform:
   acquire multiple images continuously captured at a predetermined frame rate while panning a single image capturing device having a single imaging optical system and an imaging element;
   select images for panoramic image synthesis from the multiple images acquired by the single image capturing device, and select images in which a horizontal component of a translation vector of an optical flow between the images is within a predetermined range set in advance;
   detect an overlap area with disparity between temporally adjacent images in the selected images;
   trim and cut out images of the detected overlap area;
   store the cut images of the overlap area as a left image and a right image;
   synthesize a left panoramic image and a right panoramic image based on an image group of the stored left image and an image group of the stored right image;
   set a predetermined image among the acquired multiple images as a reference image;
   detect correspondence points having a same feature between the reference image and one or multiple different images captured at different time from that of the reference image; and
   calculate the optical flow based on the correspondence points detected by the correspondence point detecting step,
   wherein the selecting images selects an image in which a horizontal component of a translation vector of the calculated optical flow is within a predetermined range set in advance, and sets the different selected image as a next reference image.

* * * * *